(12) United States Patent
Navarrini et al.

(10) Patent No.: US 7,081,440 B2
(45) Date of Patent: Jul. 25, 2006

(54) ADDITIVES FOR PERFLUOROPOLYETHER OILS

(75) Inventors: Walter Navarrini, Boffalora Ticino (IT); Patrizia Maccone, Milan (IT)

(73) Assignee: Solvay Solexis S.p.A., Milan (IT)

( * ) Notice: Subject to any disclaimer, the term of this patent is extended or adjusted under 35 U.S.C. 154(b) by 322 days.

(21) Appl. No.: 10/417,135

(22) Filed: Apr. 17, 2003

(65) Prior Publication Data

US 2003/0203823 A1    Oct. 30, 2003

(30) Foreign Application Priority Data

Apr. 17, 2002  (IT)  ............................ MI2002A0804

(51) Int. Cl.
  *C10M 131/10*  (2006.01)
  *C10M 133/32*  (2006.01)
  *C10M 147/00*  (2006.01)

(52) U.S. Cl. ..................... 508/483; 508/549; 508/582

(58) Field of Classification Search ................ 508/549, 508/483, 582
  See application file for complete search history.

(56) References Cited

U.S. PATENT DOCUMENTS

| | | | |
|---|---|---|---|
| 3,242,218 A | 3/1966 | Miller | |
| 3,250,807 A | 5/1966 | Fritz et al. | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,523,039 A | 6/1985 | Lagow et al. | |
| 4,681,693 A | 7/1987 | Gavezotti et al. | |
| 4,941,987 A * | 7/1990 | Strepparola et al. | 508/182 |
| 5,326,910 A | 7/1994 | Paciorek et al. | |
| 5,550,277 A | 8/1996 | Paciorek et al. | |
| 5,663,127 A * | 9/1997 | Flynn et al. | 508/250 |
| 5,965,496 A * | 10/1999 | Yamana et al. | 508/244 |
| 6,486,103 B1 * | 11/2002 | Burdzy et al. | 508/582 |

FOREIGN PATENT DOCUMENTS

| | | |
|---|---|---|
| EP | 0 148 482 | 7/1985 |
| EP | 0 165 649 | 12/1985 |
| EP | 0 165 650 | 12/1985 |
| EP | 0 597 369 | 5/1994 |
| GB | 1 104 432 | 2/1968 |
| GB | 1 226 566 | 3/1971 |
| WO | 95/17481 | 6/1995 |
| WO | 99/51612 | 10/1999 |

OTHER PUBLICATIONS

J.A. Webster, et al. "Synthesis and Properties of Imide and Isocyanurate-Linked Fluorocarbon Polymers" No. 129, 1973, pp. 61-79.
V.I. Skoblikova, et al. "Reaction of Fluorocarbon Epoxides with Alkali-Metal Pentafluorophenoxides" vol. 12, No. 9, 1976, pp. 1847-1850.
H.-J. Juhl, W. Heitz "Preparation of the Stationary Phase and Polymers for Testing" pp. 964-972.
Su, Debao et al "Perfluoro and Polyflurosulfonic Acids. IX. Some Chemical Transformations of 5-Halo-3-Oxaperfluoropentanesulfonyl Fluoride"vol. 41, No. 10, 1983, pp. 946-959.
Hans-Jurgen Juhl "Fluorinated Gels for Gel Permeation Chromatography" vol. 194, No. 3, 1993, p. 963.
Abstract, 03008436.2 No Date.
Carl E. Snyder, Jr. and Ronald E. Dolle, Jr., ASLE Transactions, 13(3), 171-180 (1975).

* cited by examiner

*Primary Examiner*—Ellen M. McAvoy
(74) *Attorney, Agent, or Firm*—Arent Fox PLLC

(57) ABSTRACT

Use as stabilizers of perfluoropolyether oils at high temperatures, higher than 200° C., of compounds not containing phosphor and having the general formula (A):

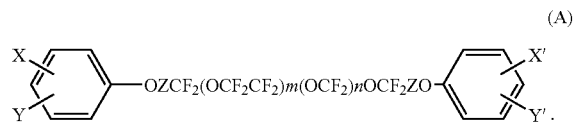

(A)

16 Claims, No Drawings

ADDITIVES FOR PERFLUOROPOLYETHER OILS

The present invention relates to the use of fluorinated compounds as stabilizing additives of perfluoropolyether oils for their use at high temperatures.

More specifically the present invention relates to the use of fluorinated compounds as stabilizing additives of perfluoropolyether oils for their use at high temperatures, in oxidizing environment and in the presence of metals.

It is known that perfluoropolyether fluids are lubricating oils used also at high temperatures. However, said fluids show the drawback that in oxidizing environment (for example oxygen, air) and in the presence of metals they have a limited thermal stability.

It is also known in the prior art that said drawback can be reduced by adding to perfluoropolyether fluids stabilizing additives. Said stabilizing additives are generally phosphor compounds wherein substituents of perfluoroalkyl, perfluorooxyalkyl and aromatic type are present. The synthesis of said compounds is generally complex or uses reactants at a high cost. The following patents can for example be mentioned. U.S. Pat. No. 4,681,693 describes stabilizers for perfluoropoly-ether fluids having a structure formed by arylphosphines, or derivatives thereof, linked to PFPE radicals through one oxygen or sulphur atom. Said compounds are synthesized by a more step process which includes intermediates difficult to be prepared. EP 597,369 describes stabilizers for perfluoropolyether fluids based on substituted phosphazene derivatives, where on the phosphazene ring both aromatic and (per)fluoropolyether radicals are contemporaneously present. The synthesis of said additives requires a double substitution on the phosphazene ring. Besides the starting phosphazene product has a high cost. This represents a further drawback from the industrial point of view.

U.S. Pat. No. 5,326,910 describes perfluoropolyether phosphotriazine derivatives as stabilizers for perfluoropolyether oils. Said derivatives are synthesized with several steps, using reactants of difficult preparation, such for example perfluorinated epoxides.

U.S. Pat. No. 5,550,277 describes stabilizers for perfluoropolyether fluids based on aromatic phosphates or phosphonates substituted by perfluoropolyether groups. The synthesis process is very complicated, it requires more steps and furthermore it employes the use of metallo-organic reactants, such for example butyl lithium, which are of difficult industrial use for the problems related to the plant safety.

Patent application WO 99/51,612 describes new phosphoric esters, in particular substituted arylphosphates, where at least one of the substituents is a radical of perfluoropolyether type.

In the preparation method of said additives, aromatic phosphoric chloroesters, having a high cost, are used. As described in the Examples of the patent application, said esters are obtained by reacting aromatic alcohols with $POCl_3$, which is a toxic and scalding substance, requiring specific equipments for the use in an industrial scale.

According to the prior art the substances used as stabilizing additives for perfluoropolyether oils contain phosphor and are obtained by using, as seen, synthesis processes comprising various steps or, alternatively, using expensive reactants.

The Applicant has surprisingly found additives which even not containing phosphor in the molecule can be suitably used as perfluoropolyether oil stabilizers at high temperatures, even in oxidizing environment and in the presence of metals. Furthermore said additives can be obtained with simplified synthesis methods using cheap reactants.

An object of the present invention is the use as stabilizers of perfluoropolyether lubricating oils at high temperatures, higher than 200° C., of compounds having the following general formula (A):

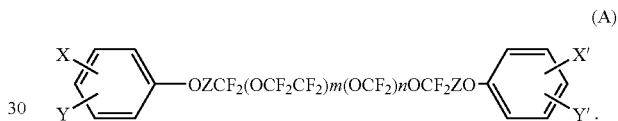

wherein:

X, Y, X', Y', equal or different, are independently the one from the other H; $NO_2$; $C_1$–$C_4$ alkyl; $C_1$–$C_4$ alkoxy, preferably methoxy group;

Z=—$CH_2$—; >C=O (carbonyl);

m and n are integers such that m is in the range 0–80, extremes included; n is in the range 0–20, extremes included; m+n being >1;

the molecular weight of the perfluoropolyether part (units with indexes m and n respectively) being from 500 to 10,000, preferably from 1,000 to 4,000.

Also mixtures of one or more formula (A) additives can be used.

Preferably the general formula (A) products are selected from the following:

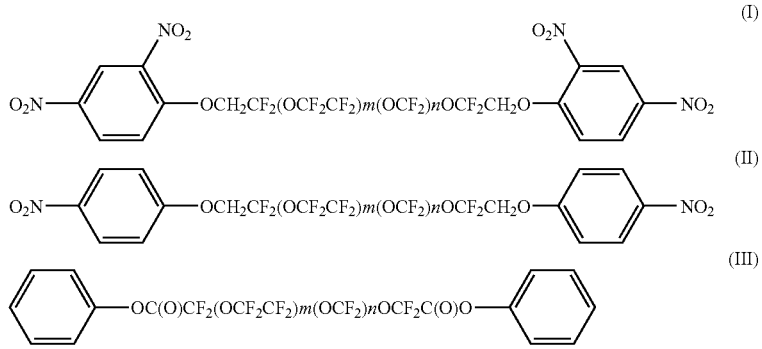

wherein m is in the range 0–80, extremes included; n is in the range 0–20, extremes included, m/n preferably being from 0.5 to 4 when n is different from zero and m+n is such to give the above molecular weight.

The general formula (A) compounds can be prepared according to U.S. Pat. No. 3,810,874, EP 165,649, EP 165,650, U.S. Pat. No. 3,250,807. They are geneally obtainable in a single step by a reaction between a perfluoropolyether derivative of formula:

$$HOZCF_2(OCF_2CF_2)m(OCF_2)nOCF_2ZOH \quad (B)$$

wherein Z, m and n are as above, with a suitable aromatic reactant having the substituents X, Y, X' and Y' as defined in formula (A). For example a nucleophilic substitution or esterification reaction can be used. In the former case the alcoholate of compound (B) (Z=—CH$_2$—), is used, in the latter case compound (B) with Z=>C=O. See the above patents.

The formula (A) compounds of the present invention are used as stabilizers for perfluoropolyether oils, available on the market as for example FOMBLIN®, marketed by Ausimont.

Said oils have perfluoroalkyl end groups, are liquid with a very low vapour pressure value and have a viscosity at 20° C. generally in the range 10–100,000 cSt, preferably 30–2,000 cSt.

The perfluoropolyether oils are formed by repeating units statistically distributed along the chain, and have for example the following structures:

$$B—O—[C_3F_6O]_{m'}(CFT'O)_{n'}—B' \quad (1)$$

wherein:

T'=F, CF$_3$;

B and B', equal to or different from each other, are selected from —CF$_3$, —C$_2$F$_5$ or —C$_3$F$_7$;

m' and n' are integers such that the m'/n' ratio is in the range 20–1,000, n' being different from zero, and the product viscosity is within the above limits;

said products can be obtained by photooxidation of the perfluoropropene as described in GB 1,104,432, and by subsequent conversion of the end groups as described in GB 1,226,566.

$$C_3F_7O—[C_3F_6O]_{o'}-D \quad (2)$$

wherein:

D is equal to —C$_2$F$_5$ or —C$_3$F$_7$;

o' is an integer such that the product viscosity is in the above range;

said products can be prepared by ionic oligomerization of the perfluoropropylenoxide and subsequent treatment with fluorine as described in U.S. Pat. No. 3,242,218.

$$B—O—[CF(CF_3)CF_2O]_{q'}(C_2F_4O)_{r'}(CFT'O)_{s'}—B' \quad (3)$$

wherein:

T' is as above;

B and B', equal to or different from each other, are selected from —CF$_3$, —C$_2$F$_5$ or —C$_3$F$_7$;

q', r' and s' are integers and can have also the value of zero, with the proviso that they are not all contemporane-
ously equal to zero, and are such that the product viscosity is in the above range, i.e. 10–100,000 sSt, preferably 30–2,000 cSt;

said products are obtainable a mixture photooxidation of C$_3$F$_6$ and C$_2$F$_4$ and subsequent treatment with fluorine as described in U.S. Pat. No. 3,665,041.

$$B—O—(C_2F_4O)_{t'}(CF_2O)_{u'}—B' \quad (4)$$

wherein:

B and B', equal to or different from each other, are selected from —CF$_3$, —C$_2$F$_5$ or —C$_3$F$_7$;

t' and u' are integers such that the t'/u' ratio is in the range 0.1–5, preferably 0.5–4, u' being different from zero, and the product viscosity is in the above range;

said products are obtained by photooxidation of C$_2$F$_4$ as reported in U.S. Pat. No. 3,715,378 and subsequent treatment with fluorine as described in U.S. Pat. No. 3,665,041.

$$B—O—(CF_2CF_2CF_2O)_{v'}—B' \quad (5)$$

wherein:

B and B', equal to or different from each other, are selected from —CF$_3$, —C$_2$F$_5$ or —C$_3$F$_7$;

v' is a number such that the product viscosity is in the above range;

said products are obtained as reported in EP 148,482.

$$D-O—(CF_2CF_2O)_{z'}-D' \quad (6)$$

wherein:

D and D', equal to or different from each other, are selected between —C$_2$F$_5$ or —C$_3$F$_7$;

z' is an integer such that the product viscosity is in the above range;

said products can be obtained as reported in U.S. Pat. No. 4,523,039.

The —C$_3$F$_6$O— unit in the above formulas can have structure —CF(CF$_3$)CF$_2$O— or —CF$_2$CF(CF$_3$)O—.

According to the present invention the class (4) perfluoropolyethers are preferably used.

The formula (A) compounds are mixed with perfluoropolyether oils in a percentage from 0.01 to 10% by weight, preferably from 0.2 to 5% with respect to the perfluoropolyether oil weight. Preferably the formula (I) compound is used.

To the aforesaid mixtures other additives commonly used in the perfluoropolyether lubricating compositions can be added.

The compositions comprising the invention additives can be used in the presence of metals and in the presence of air and oxygen at high tempertures, higher than 200° C., up to the oil decomposition temperature. In particular the invention additive can be used at temperatures of about 320° C., preferably up to 300° C.

The invention compositions, perfluoropolyether lubricating oil+additive, can be used for the above uses, preferably the additive has formula (I).

The following Examples are given for illustrative and not limitative purposes of the invention.

EXAMPLES

Microoxidation Test

The microoxidation test used in the Examples has been carried out using the equipment described in the following publication: Carl E. Snyder, Jr. and Ronald E. Dolle, Jr., ASLE Transactions, 13(3), 171–180 (1975). The used operating conditions have been the following:

Perfluoropolyether oil utilized: Fomblin®M30 having kinematic viscosity at 20° C. of 270 cSt ($2.7 \cdot 10^8$ m²/s) and acidity, determined with the method indicated hereinafter, lower than 0.01 mg KOH/g;
Test temperature: 300° C.;
Test duration: 24 h;
Air flow: 1 litre/h;
Metals dipped in the fluid: stainless steel (AISI 304) and titanium alloy containing Al 6%, V 4% (Titanium 6A14V).

The tested fluid is introduced into the glass test tube of the equipment, shown in FIG. 1 of the above reference, and the test tube charged with the fluid and the metal is weighed and brought to the test temperature. The established time elapsed, the glass test tube is cooled to room temperature and weighed again. The per cent weight loss of the tested fluid is determined by the difference of the weight before and after the thermal treatment. The fluid is then recovered and the kinematic viscosity and the acidity are determined. After the test the surface aspect of the metals which have been dipped in the tested fluid is visually evaluated.

Determination of the Perfluoropolyether Oil Acidity Number

The acidity number of the tested PFPE is measured by mixing under a light nitrogen flow, in the order, 5 ml of KOH 0,01 N, 10 g of sample to be tested, 30 ml of Freon 113 and 40 ml of MeOH. The base excess is titred with HCl 0.01 N by a potentiographic automatic titrator.

The acidity number N, is determined by the following formula:

$$N = 0.56 \cdot (B-A)/W,$$

wherein B=ml of HCl 0.01 N used for the control test (without sample), A=ml of HCl 0.01 N used in the titration of the base excess and W is the sample weight in grams. Therefore N is expressed in mg KOH/g fluid.

Determination of the Kinematic Viscosity of the Perfluoropolyether Oil

The kinematic viscosity has been determined by capillary viscosimeter Cannon-Fenske according to the ASTM D 445 method.

Example 1

Synthesis of the bis(2,4-dinitro phenil) (per)fluoropolyether Derivative

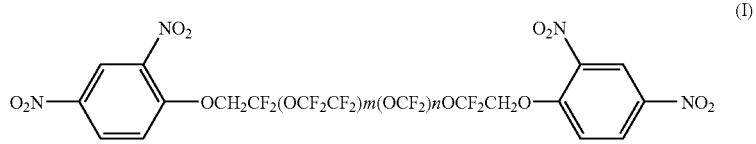

(I)

11.8 g of potassium terbutylate are dissolved in 200 ml of terbutanol in a 500 ml three necked flask, equipped with mechanical stirrer, water refrigerant, thermometer and nitrogen head. Subsequently, maintaining the reactor at room temperature by means of a water bath, 100 g of ZDOL® 2000 of formula $HOCH_2CF_2(OCF_2CF_2)_m(OCF_2)_nOCF_2CH_2OH$ MW=1966 EW=993, m/n=1.2 are dripped. When dripping is over, the reaction mixture is left under stirring for two hours under nitrogen head.

Lastly a solution composed of 21.2 g of 2,4-dinitro chlorobenzene dissolved in 28 ml of dioxane is slowly dripped at room temperature. A yellow brownish precipitate mainly consisting of KCl immediately forms.

The reactor is left under stirring for one hour at room temperature, then for one hour at 65° C. and lastly for another hour at 75° C. The reaction raw product is discharged in 600 ml of water. A turbid yellow brownish oil separates and the aqueous supernatant is extracted with two portions of 20 ml each of $CF_2Cl-CFCl_2$ having boiling point of 47.6° C.

The fluorinated phases are joined to the oil and the mixture is decoloured by mixing with active carbon. The mixture is filtered on porous septum and dried, it is washed with two portions of 10 ml each of ethanol to remove the unreacted 2,4-dinitrochlorobenzene, it is dried under vacuum at 60° C. for one hour. 92 g of product are isolated.

Characterization of the Product:

NMR $^{19}F$ spectrum in ppm (with respect to $CFCl_3$=0): $-51/-56$ (17F, $(OCF_2)_n$); $-87/-91$ (42F, $(OCF_2CF_2)_m$); $-76/-80$ (4F, $OCF_2CH_2O$); NMR $^1H$ spectrum in ppm (with respect to TMS): 5.1 (4H, $OCF_2CH_2$); 8.8 (2H aromatic $CNO_2$—CH—$CNO_2$); 8.6 (2H aromatic $CNO_2$CH—CH—); 7.8 (2H aromatic Rf-$CH_2OC$—CH—CH—); IR spectrum (cm$^{-1}$) intensity: (w)=weak, (m)=mean, (s)=strong, (vs) =very strong 3092(w), 1612(w), 1542(w), 1351(m), 1207 (vs), 1096(vs). Said NMR peakds show that the product has formula (I) for 91% by weight. NMR $^{19}F$ spectrum in ppm (with respect to the $CFCl_3$=0): $-81/-82$ (0-C$\underline{F}_2$—$CH_2$—OH); NMR $^1H$ spectrum in ppm (with respect to the TMS): 4.0 (0-$CF_2$—C$\underline{H}_2$—OH).

Example 2

Synthesis of the bis(p-nitrophenyl) (per)fluoropolyether Derivative

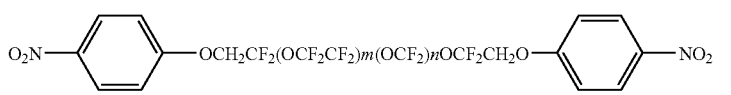

(II)

In a flask, equal to that used in Example 1, potassium terbutylate, terbutanol and ZDOL® 2000 are added under the same conditions and amounts described therein.

Lastly a solution composed of 14.8 q of p-nitrofluorobenzene dissolved in 30 ml of dioxane is slowly dripped at room temperature. The reactor is left under stirring for one hour at room temperature, then for one hour at 65° C. and lastly for two hours at 85° C. The reaction raw product is discharged in 600 ml of water. The oil is recovered as described in Example 1. The dried reaction raw product is then washed with two portions of 10 ml each of ethanol to remove the unreacted p-nitrofluorobenzene; it is dried under vacuum at 60° C. for one hour. 85 g of product are isolated.

Characterization of the Product:

NMR $^{19}$F spectrum in p.p.m. (with respect to the $CFCl_3$=0): −51/−56 (17F, $(OCF_2)_n$); −87/−91 (42F, $(OCF_2CF_2)_m$); −76/−80 (4F, $OCF_2CH_2O$); NMR $^1$H spectrum in ppm (with respect to TMS): 4.8 (4H, $OCF_2CH_2$); 7.3 (4H aromatic in meta to $NO_2$); 8.3 (4H aromatic in ortho to $NO_2$); IR spectrum (cm$^{-1}$) intensity: (w)=weak, (m)=mean, (s)=strong, (vs)=very strong 3090(w), 1789(w), 1596(m), 1596(m), 1522(m), 1456(w), 1350(s), 1200(vs), 1100(vs). Said NMR peaks show that the product has formula (II) for 93% by weight. NMR $^{19}$F spectrum in ppm (with respect to $CFCl_3$=0): −81/−82 (0-C$\underline{F}_2$—CH$_2$—OH). NMR $^1$H spectrum in ppm (with respect to TMS): 4.0 (0-CF$_2$—C$\underline{H}_2$—OH).

Example 3

Synthesis of the (per)fluoropolyether phenyl ester Having Formula

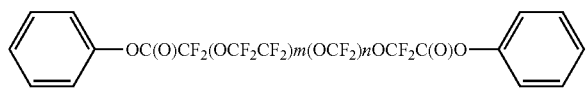

(III)

In a flask equal to that described in Example 1, 24 g of phenol, 200 g of an acylfluoride of formula:

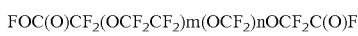

FOC(O)CF$_2$(OCF$_2$CF$_2$)m(OCF$_2$)nOCF$_2$C(O)F prepared according to U.S. Pat. No. 3,715,378, having molecular weight 2,400, m/n=1.3 and 30 g of NaF, are introduced, in the order. The heterogeneous mixture is heated under stirring at 80° C. for two hours. When heating is over, the product is filtered and heated at 135° C. in a vacuum of 0.5 mm Hg (67 Pa) to remove the unreacted phenol. 198 g of the desired product are isolated.

Characterization of the Product:

NMR $^{19}$F spectrum in p.p.m. (with respect to CFCl$_3$=0): −51/−56 (20F, $(OCF_2)_n$); −87/−91 (52F, $(OCF_2CF_2)_m$); −80/−84 (4F, OCF$_2$(O)O); NMR $^1$H spectrum in ppm (with respect to TMS): 7.5/7.3 (4H ortho); 7.3/7.2 (6H: 2H in para, 4H in meta); IR spectrum (cm$^{-1}$) intensity: (w)=weak, (m)=mean, (s)=strong, (vs)=very strong 3588(w), 2364(w), 1805(vs), 1593(m), 1494(s), 1204(vs).

Said NMR peaks show that the product has formula (I) for 100% by weight.

Example 4

Microoxidation Test of a perfluoropolyether Oil Added to the Product Obtained in Example 1.

50 g of perfluoropolyether oil Fomblin®M30 are added with 0.5 g of the product obtained in Example 1 (1% by weight of the additive with respect to the oil) and then introduced into the glass test tube for the microoxidation test as above described. During the test the fluid has maintained limpid and no smoke development has been observed.

At the test end under the mentioned operating conditions a per cent loss ΔP% of fluid equal to 1.6% by weight has been measured. The kinematic viscosity has substantially remained unchanged (Δη=+0.84%).

The fluid acidity has not changed. The metals recovered, from the fluid at the test end (stainless steel and Ti, Al, V alloy) did not show oxidation/corrosion signs, and their surface aspect was comparable with that of the specimens of the same metals not subjected to the treatment.

Example 5

Microoxidation Test of a Perfluoropolyether Oil Added with the Product Obtained in Example 2.

Example 4 is repeated by using as additive 0.5 g of the product obtained in Example 2.

At the test end under the mentioned operating conditions a per cent loss ΔP% of fluid of 1.3% has been measured. The kinematic viscosity has substantially remained unchanged (Δη=+0.6%). The fluid acidity is not changed. The metals recovered from the fluid at the test end (stainless steel and Ti, Al, V alloy) did not show oxidation/corrosion signs, and their surface aspect was comparable with that of the specimens of the same metals not subjected to the treatment.

Example 6

Microoxidation Test of a Perfluoropolyether Oil Added with the Product Obtained in Example 3.

Example 4 is repeated by using as additive 0.5 g of the product obtained in Example 3. At the test end under the mentioned operating conditions a per cent loss $\Delta P\%$ of fluid equal to 1.7% and a kinematic viscosity variation equal to $\Delta\eta=+2.1\%$ have been measured.

The fluid acidity is not changed. The metals recovered from the fluid at the test end (stainless steel and Ti, Al, V alloy) did not show oxidation/corrosion signs, and their surface aspect was comparable with that of the specimens of the same metals not subjected to the treatment.

Example 7 (Comparative)

Microoxidation Test of a Not Additivated Perfluoropolyether Oil in Absence of Metals.

Example 4 is repeated without adding the additives of the present invention and in absence of metals in the perfluoropolyether oil.

During the test the development of white smokes has been observed.

At the test end under the mentioned operating conditions a per cent loss $\Delta P\%$ of fluid of 4.6% by weight and a kinematic viscosity variation equal to $\Delta\eta=+0.5\%$ have been measured. The measured final fluid acidity has been 0.07 mg KOH/g.

Example 8 (Comparative)

Microoxidation Test of a Not Additivated Perfluoropolyether Oil in the Presence of Metals.

Example 4 is repeated without adding the additives of the present invention.

During the test the intense development of white smokes has been observed.

At the test end under the mentioned operating conditions a very high per cent loss $\Delta P\%$ of fluid equal to 82.8% by weight has been measured.

The measured final fluid acidity has been of 5.5 mg KOH/g. The surface aspect of the metals has resulted modified for the presence of evident oxidation signs (browning).

Example 9

Microoxidation Test of a Perfluoropolyether Oil Added with the Product Obtained in Example 1.

Example 4 has been repeated but by using 0.125 g of the product obtained in Example 1 (0.25% by weight of the additive with respect to the oil).

During the test the fluid has maintained limpid and no smoke development has been observed.

At the test end under the mentioned operating conditions a per cent loss $\Delta P\%$ of fluid of 0.18% has been measured, while the kinematic viscosity has substantially remained unchanged ($\Delta\eta=+1.33\%$).

The fluid acidity is not changed. The metals recovered from the fluid at the test end (stainless steel and Ti. Al, V alloy) did not show oxidation/corrosion signs, and their surface aspect was comparable with that of the specimens of the same metals not subjected to the treatment.

The following Table 1 summarizes the results obtained in Examples 4–9.

TABLE 1

| | | | | Final fluid after microoxidation test | | |
|---|---|---|---|---|---|---|
| Ex. | Metal treatment | Concentration and used compounds of formula (A) | | Fluid weight variation | Kinematic viscosity variation | Acidity mg |
| | | % by weight | formula | $\Delta P$ % | $\Delta\eta$ % | KOH/g |
| 4 | Yes | 1 | (I) | −1.6 | 0.84 | <0.01 |
| 5 | Yes | 1 | (II) | −1.3 | 0.60 | <0.01 |
| 6 | Yes | 1 | (III) | −1.7 | 2.1 | <0.01 |
| 7 comp | No | — | — | −4.6 | 0.5 | 0.07 |
| 8 comp | Yes | — | — | −82.8 | — | 5.5 |
| 9 | Yes | 0.25 | (I) | −0.2 | 1.33 | <0.01 |

What is claimed is:

1. A process for stabilizing perfluoropolyether lubricating oils at high tempertures, higher than 200° C., by mixing with said perfluoropolyether oils compounds having the following general formula (A):

$$\text{(A)}$$

$$X\text{-}\underset{Y}{\diagdown}\text{-}OZCF_2(OCF_2CF_2)m(OCF_2)nOCF_2ZO\text{-}\underset{Y'}{\diagdown}\text{-}X'$$

wherein:
  X, Y, X', Y', equal to or different, are independently the one from the other H; $NO_2$; $C_1$–$C_4$ alkyl; $C_1$–$C_4$ alkoxy, or methoxy group;
  Z=—$CH_2$—; >C=O carbonyl;
  m and n are integers such that m is in the range 0–80, extremes included; n is in the range 0–20, extremes included, m+n being >1;
  the molecular weight of the perfluoropolyether part, units with indexes m and n, being from 500 to 10,000,
  wherein the compounds of formula (A) are mixed with the perfluoropolyether oils in a percentage from 0.2 to 5% by weight with respect to the perfluoropolyether oils weight.

2. The process of claim 1, wherein the general formula (A) compounds are selected from the following:

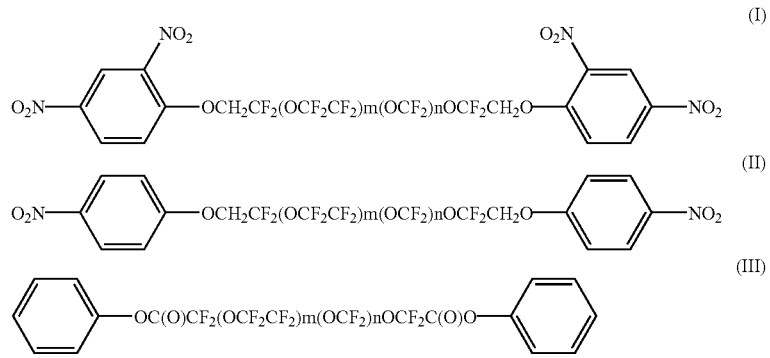

wherein m is in the range 0–80, extremes included; n is in the range 0–20, extremes included, and m+n is such to give the above molecular weight.

3. The process of claim 1, wherein the perfluoropolyether oils have perfluoroalkyl end groups and have a viscosity at 20° C. in the range 10–100,000 cSt.

4. The process of claim 1, wherein the perfluoropolyether oils have the repeating units statistically distributed along the chain and have the following structures:

$$B\text{—}O\text{—}[C_3F_6O]_{m'}(CFT'O)_{n'}\text{—}B' \quad (1)$$

wherein:
$T'=F, CF_3$;
B and B', equal to or different from each other, are selected from $—CF_3, —C_2F_5$ or $—C_3F_7$;
m' and n' are integers such that the m'/n' ratio is in the range 20–1,000, n' being different from zero, and the product viscosity is in the above limits;

$$C_3F_7O\text{—}[C_3F_6O]_{o'}\text{-}D \quad (2)$$

wherein:
D is equal to $—C_2F_5$ or $—C_3F_7$;
o' is an integer such that the product viscosity is in the above range;

$$B\text{—}O\text{—}[CF(CF_3)CF_2O]_{q'}(C_2F_4O)_{r'}(CFT'O)_{s'}\text{—}B' \quad (3)$$

wherein:
T' is as above;
B and B', equal to or different from each other, are selected from $—CF_3, —C_2F_5$ or $—C_3F_7$;
q', r' and s' are integers and can take also the value of zero, with the proviso that they are not all contemporaneously equal to zero, and are such that the product viscosity is in the above range;

$$B\text{—}O\text{—}(C_2F_4O)_{t'}(CF_2O)_{u'}\text{—}B' \quad (4)$$

wherein:
B and B', equal to or different from each other, are selected from $—CF_3, —C_2F_5$ or $—C_3F_7$;
t' and u' are integers such that the t'/u' ratio is in the range 0.1–5, u' being different from zero, and the product viscosity is in the above range;

$$B\text{—}O\text{—}(CF_2CF_2CF_2O)_{v'}\text{—}B' \quad (5)$$

wherein:
B and B', equal to or different from each other, are selected from $—CF_3, —C_2F_5$ or $—C_3F_7$;
v' is a number such that the product viscosity is in the above range;

$$D\text{-}O\text{—}(CF_2CF_2O)_{z'}\text{-}D' \quad (6)$$

wherein:
D and D', equal to or different from each other, are selected between $—C_2F_5$ or $—C_3F_7$;
z' is an integer such that the product viscosity is in the above range,
wherein
the $—C_3F_6O—$ unit in the above formulas can have the structure $—CF(CF_3)CF_2O—$ or $—CF_2CF(CF_3)O—$.

5. The process of claim 1, wherein the perfluoropolyether oils have structure (4).

6. The process of claim 2, wherein the formula (I) compound is uesd.

7. The process of claim 1, wherein in the mixing process other additives commonly used in perfluoropolyether lubricating compositions can be added.

8. The process of claim 1, wherein the compositions are used in the presence of metals and in the presence of air and oxygen at high temperatures, higher than 200° C., up to the oil decomposition temperature.

9. Compositions prepared by the process of claim 1.

10. Compositions prepared by the process of claim 2, wherein the additive has formula (I).

11. The process of claim 1, wherein said molecular weight of the perfluoropolyether part is from 1,000, to 4,000.

12. The process of claim 2, wherein m/n is from 0.5 to 4 when n is different from zero.

13. The process of claim 3, wherein said viscosity at 20° C. is in the range 30–2,000 cSt.

14. The process of claim 4, wherein said t'/u' ratio is in the range 0.5–4.

15. The process of claim 8, wherein said high temperatures are up to about 320° C.

16. The process of claim 8, wherein said high temperatures are up to 300° C.

* * * * *